3,320,207
PROCESS FOR APPLYING ULTRAVIOLET
ABSORBERS TO TEXTILE MATERIALS
Philip B. Roth, Somerville, N.J., Leonard B. Hallows,
Lima, Peru, and William N. Nakajima, Somerville,
N.J., assignors to American Cyanamid Company, New
York, N.Y., a corporation of Maine
No Drawing. Filed Dec. 21, 1961, Ser. No. 161,275
10 Claims. (Cl. 260—45.95)

This invention relates in general to a novel method for reducing the strength degradation of certain hydrophobic polymeric materials in fiber form. More particularly, the invention relates to the stabilization of hydrophobic polymeric materials of a super-polyamide class such as hexamethylenepolyadipamide and megaaminocaproamide commercially known under the trade name Nylons which are known to be susceptible to ultraviolet degradation. These particular super-polyamides are rendered light stable by means of the instant process which essentially involves the application and heat diffusion of certain ultraviolet radiation absorbing compounds added thereto.

By the term "ultraviolet degradation" as it is employed herein, it is intended to refer to the partial disintegration of textile fabrics composed of fibers of hydrophobic polymeric materials of synthetic origin, particularly those of the super-polyamide class, in the presence of continued exposure to a strong source of ultraviolet radiation such as ordinary sunlight.

It is well known that organic plastics particularly those of the superpolyamide class become brittle and eventually deteriorate when exposed to sunlight. This is especially true when the resin has been formed into such fabrics as draperies, curtains, sails, tents, awnings, cordage and the like which by virtue of their end use are exposed for protracted periods of time to the ultraviolet radiation contained in normal sunlight. In an attempt to alleviate the damaging effect of sunlight on these fabrics, it has been proposed that there be incorporated therein stabilizers such as 2,4-dihydroxyacetophenone, 4,4-dihydroxybenzophenone, and 4-benzoylresorcinol and the like. For example, U.S. Patent No. 2,568,894 suggests the incorporation of the latter compound into the batch or dope from which nylon yarn is spun. In addition, copending application of Colman, Serial No. 785,307, filed Jan. 7, 1959, now U.S. Patent No. 3,049,443 discloses the surface deposition of certain ortho-hydroxybenzophenones on nylon to protect the fibers against deterioration. However, in none of these instances of the prior art has it been possible to protect the nylon fiber from deterioration in those cases where the protective coating may become removed from the surface of the fiber. In these cases the fiber has suffered internal deterioration and eventual destruction due to the penetration of the damaging radiation.

In still other cases attempts at the complete dispersion of the UV absorber by introduction directly into the batch prior to formation of the filamental fiber has effected such a thin random dispersion of the protective UV absorbers in the fiber that their protection is rendered negligible. In either case, after a protracted period of time of exposure to strong ultraviolet radiation, the tensile strength of the fibers is diminished to such an extent that the fabric which they comprise is essentially useless.

It is a primary object of the present invention to disclose a novel method for the application of a class of known UV absorbers to a formed body of hydrophobic polymeric materials particularly of the super-polyamide type which treatment renders them resistant to deterioration by ultraviolet radiation.

It is a further object of the present invention to disclose a novel method for the penetration of ultraviolet absorbers of the type described into nylon fabrics, fibers and filaments.

Other objects of the invention will appear from the following description of the invention in its more broad conceptual nature as well as in the illustrative examples and comparative data which illustrates its utility.

Accordingly, our invention is based on the discovery that hydrophobic polymeric materials, particularly nylon, when treated with an ultraviolet absorbing compound of the generic formula:

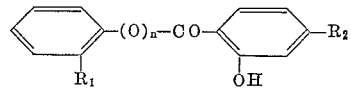

wherein $R_1$ is selected from the group consisting of hydrogen and hydroxy; $R_2$ is selected from the group consisting of hydroxy or lower alkoxy and $n$ is either zero or one, may be thereby rendered permanently light stable. The term lower alkoxy, as employed to describe our novel stabilizers, refers to those compounds wherein $R_2$ has from 1 to about 7 carbon atoms in the alkoxy group. The above compound is applied as an emulsified solution to a formed fiber or film of a super-polyamide, dried and dry heat cured for 0.5 to 5 minutes at a curing temperature in excess of 225° F. A surface penetration of the polyamide hydrophobic polymeric material by the ultraviolet radiation absorbing compound above is thus achieved which is neither so dispersed as to be ineffectual or so superficial as to rub or wash off but rather one which will serve to fix in the fiber and permanently block the penetration of the damaging ultraviolet radiation. This finding will be more specifically elaborated in the several examples which are comprehended herein.

It is a particular feature of our novel process that the drying step wherein the ultraviolet light absorber is dried in contact with the fiber may be either a separate drying step conducted at room temperature preliminary to heat treatment at elevated temperatures greater than 225° F. to thermally impregnate or it may be compounded. In the latter case the fiber with the wet coating of ultraviolet absorber is directly heat treated at elevated temperatures as directed. The use of one or the other of these techniques is a matter of individual choice based on the available equipment and other process requirements present at the time of treatment.

In the one step drying and heating of the ultraviolet absorber on the fiber, the critical temperature limitation recited above, of course, also applies.

We have found that the ultraviolet absorbers of the class employed exhibit excellent substantivity and affinity for the hydrophobic materials which they are designed to partially penetrate. The net results of such partial penetration is the formation of a nonuniform barrier or band of the ultraviolet absorbing substances with concentration of the barrier substance in the regions located in the direction of the periphery of the fiber or film and with a more sparse concentration in the central area of the body which has been subjected to the novel curing treatment.

The application of the ultraviolet absorber of our process involves a padding of the fabric to be treated in an aqueous emulsion or solution of the UV absorbers, the former containing a suitable emulsifying agent. After the ultraviolet absorbers are brought into contact with the fabric to be treated they are applied to the surface thereof by conventional techniques which involve, in most cases, applying at room temperature or, if desired, treating bath to slightly elevated temperatures. This treatment in the formation of a concentrated outer layer of the absorbers located on or near the surface of the fiber and forms the substrate for the application of our novel processing step. The thus treated fiber is dried by conventional technique. Following the drying step, our novel and critical heat impregnating step is employed which involves heating the treated fiber to not less than about 225° F. nor more than about 350° F. for about 0.5 to 5 minutes to open up and effect a surface penetration of the fabric by the UV absorber employed. As a result of this heat treatment the hydroxylated benzophenones and aryl substituted resorcylates are so positioned in the fibers as to not only resist rubbing or washing from the surface thereof but also to have sufficiently penetrated the fiber as to achieve a wide band of radiation absorptive particles therein.

The hydroxylated benzophenones and aryl substituted resorcylates of the invention may be dispersed in the liquid bath from which they are preliminarily applied to the surface of the fiber in a number of conventional ways. For example, they may be dispersed in a solution of tetra sodium pyrophosphate or from a solution of ethanol and water or still further from an aqueous emulsion of an ester of an aromatic carboxylic acid and a UV absorber of the class of hydroxylated benzophenones such as 2,2,4-trihydroxybenzophenone, 2,4 - dihydroxybenzophenone, 2,2'-dihydroxy-4-methoxybenzophenone, 2-hydroxy-4-octoxybenzophenone, 2,2' - dihydroxy - 4 - octoxybenzophenone. In a similar manner the substituted benzophenones described in U. S. Patent No. 2,777,828 of January 15, 1957, such as 2,2'-dihydroxy-4,4'-diethoxybenzophenone, 2,2' - dihydroxy - 4,4' - dipropoxybenzophenone, 2,2' - dihydroxy-4'ethoxybenzophenone, 2,3'-dihydroxy-4-methxy-4-butoxybenzophenone, 2-hydroxy-4,4',5'-trimethoxybenzophenone, 2-hydroxy-4-propoxybenzophenone and the like may also be employed.

The hydrophobic polymeric materials treated in the manner of our invention are preferably of the super-polyamide type such as hexamethylenepolyadipamide and polyomegaaminocapramide and the like which due to their high alkalinity exhibit a strong tendency to split or decompose hydroxylated benzophenones or aryl substituted resorcylates at temperatures in excess of about 350° F.

It should be pointed out that the UV absorbers of the present invention due to their heat sensitivity may not be impregnated or even coated on the nylon substance in the manner conventional to the introduction of the well known dyestuffs such as those of the anthraquinone or thioindigo series, for example. In addition to being heat sensitive at temperatures in excess of 350° F. the UV absorbers of our invention are only soluble in organic solvents. Therefore, when deposited on the surface of the super-polyamide film or fiber in a conventional pad bath are subject to removal upon subsequent treatment involving contact with organic solvents unless otherwise fixed in the interior of the fiber.

The hydroxylated benzophenones of the invention in particular are insoluble in water and must be prepared in solutions of organic solvents or in dispersible emulsions by dissolving the individual compound in an appropriate solvent and adding to this during mixing an emulsifying agent. The preferred organic solvents are amyl acetate or toluene although other solvents such as benzene may be employed. The preferred emulsifying agent is a condensation product of 1 mole of nonylphenol with 9 moles of ethylene oxide. Also such emulsifiers as octylphenol, nonylphenol or dodecylphenol-ethylene oxide condensates presently available commercially under a variety of trade names may be employed with equally good results.

Although the critical range of temperature of our heat treating step is broadly from 225–350° F. we prefer to operate our process so that the temperature of said step is about 300–350° F. depending to some extent on the percent of solids of UV absorber based on weight of the fabric treated. The general rule followed is that at the higher temperatures less UV absorber solids need be employed and the treating time may be reduced in the range of about 0.5–5 minutes.

The following examples illustrate some of the formulae, methods of application and test data obtained as a result thereof. These examples are intended purely to further explain and embody our invention and not to define or limit its scope. The proper scope of the invention can only be measured by reference to the several claims appended to this specification.

*Example 1*

A series of emulsions containing the various ultraviolet radiation absorbers employed in our novel process are prepared by dissolving a minor portion of the particular ultraviolet absorber in a major portion of an appropriate organic solvent such as amyl acetate or toluene. A well known emulsifying agent such as the condensation product of 1 mole of nonylphenol with 9 moles of ethylene oxide is then admixed therein to give the following solutions:

| | Parts by weight |
|---|---|
| Reagent I: | |
| Phenyl beta-resorcylate | 25.0 |
| Amyl acetate | 60.0 |
| Emulsifier | 15.0 |
| | 100.0 |
| Reagent II: | |
| 2,2',4-trihydroxybenzophenone | 20.0 |
| Amyl acetate | 60.0 |
| Emulsifier | 20.0 |
| | 100.0 |
| Reagent III: | |
| 2,4-dihydroxybenzophenone | 20.0 |
| Amyl acetate | 60.0 |
| Emulsifier | 20.0 |
| | 100.0 |
| Reagent IV: | |
| 2,2'-dihydroxy-4-methoxyphenzophenone | 20.0 |
| Toluene | 65.0 |
| Emulsifier | 15.0 |
| | 100.0 |
| Reagent V: | |
| 2-hydroxy-4-octoxybenzophenone | 20.0 |
| Toluene | 65.0 |
| Emulsifier | 15.0 |
| | 100.0 |
| Reagent VI: | |
| 2,2'-dihydroxy-4-octoxybenzophenone | 25.0 |
| Amyl acetate | 67.0 |
| Emulsifier | 8.0 |
| | 100.0 |

The above emulsions are applied as dilute aqueous emusions to filament nylon taffeta at 1 percent, 3 percent and 5 percent solids level based on the weight of the fabric treated. Application baths of the specific absorbers are applied to the textile material and are dried for about 1 minute at 225° F. Selected portions of the fabric are then subjected to further heat treatments employing temperatures of 225° F., 300° F. and 350° F. for periods of 1, 3 or 5 minutes.

The above treating solutions are applied to the fabric to be treated by passing the nylon taffeta through each solution in a pad box followed by squeezing on a conventional air pressure, three roll padder.

Scott tensile tests (A.S.T.M. test method D-39-59) are performed on each of the treated fabrics after 1 or 3 weeks exposure in direct sunlight. For control and comparison purposes untreated control swatches of nylon taffeta are evaluated under identical test conditions.

The results of these tests are presented on the following Tables 1 through 5.

TABLE 1
[2-hydroxy-4-octoxy-benzophenone]

| Drying Conditions | | Heat Treatments | | Percent Tensile Loss (sunlight exposure) | |
|---|---|---|---|---|---|
| Time (min.) | Temp. (° F.) | Time (min.) | Temp. (° F.) | 1 week | 3 weeks |
| 1% SOLIDS ON FABRIC | | | | | |
| 1 | 225 | 1 | 225 | 43 | 78 |
| 1 | 225 | 1 | 350 | 37 | 74 |
| 1 | 225 | 5 | 225 | 36 | 77 |
| 1 | 225 | 5 | 350 | 43 | 60 |
| 3% SOLIDS ON FABRIC | | | | | |
| 1 | 225 | (1) | (1) | 35 | 72 |
| 1 | 225 | 3 | 300 | 32 | 62 |
| 5% SOLIDS ON FABRIC | | | | | |
| 1 | 225 | (1) | (1) | 38 | 70 |
| 1 | 225 | 1 | 225 | 41 | 65 |
| 1 | 225 | 1 | 350 | 29 | 74 |
| 1 | 225 | 5 | 225 | 33 | 67 |
| 1 | 225 | 5 | 350 | 30 | 68 |
| (1) | (1) | (1) | (1) | 46 | 81 |

[1] Untreated.

TABLE 2
[2,2'-dihydroxy-4-methoxybenzophenone]

| Drying Conditions | | Heat Treatments | | Percent Tensile Loss (sunlight exposure) | |
|---|---|---|---|---|---|
| Time (min.) | Temp. (° F.) | Time (min.) | Temp. (° F.) | 1 week | 3 weeks |
| 1% SOLIDS ON FABRIC | | | | | |
| 1 | 225 | (1) | (1) | 34 | 69 |
| 1 | 225 | 1 | 225 | 36 | 68 |
| 1 | 225 | 1 | 350 | 29 | 71 |
| 1 | 225 | 5 | 225 | 38 | 69 |
| 1 | 225 | 5 | 350 | 27 | 68 |
| 3% SOLIDS ON FABRIC | | | | | |
| 1 | 225 | (1) | (1) | 28 | 52 |
| 1 | 225 | 3 | 300 | 18 | 41 |
| 1 | 225 | 3 | 300 | 21 | 61 |
| 5% SOLIDS ON FABRIC | | | | | |
| 1 | 225 | (1) | (1) | 30 | 51 |
| 1 | 225 | 1 | 225 | 24 | 61 |
| 1 | 225 | 1 | 350 | 21 | 45 |
| 1 | 225 | 5 | 225 | 26 | 49 |
| 1 | 225 | 5 | 350 | 23 | 68 |
| (1) | (1) | (1) | (1) | 46 | 81 |

[1] Untreated.

TABLE 3
[Phenyl beta-resorcylate]

| Drying Conditions | | Heat Treatments | | Percent Tensile Loss (sunlight exposure) | |
|---|---|---|---|---|---|
| Time (min.) | Temp. (° F.) | Time (min.) | Temp. (° F.) | 1 week | 3 weeks |
| 1% SOLIDS ON FABRIC | | | | | |
| 1 | 225 | (1) | (1) | 32 | 69 |
| 1 | 225 | 1 | 225 | 31 | 67 |
| 1 | 225 | 1 | 350 | 30 | 69 |
| 1 | 225 | 5 | 225 | 34 | 68 |
| 1 | 225 | 5 | 350 | 30 | 65 |
| 3% SOLIDS ON FABRIC | | | | | |
| 1 | 225 | (1) | (1) | 33 | 61 |
| 1 | 225 | 3 | 300 | 26 | 56 |
| 1 | 225 | 3 | 300 | 22 | 55 |
| 5% SOLIDS ON FABRIC | | | | | |
| 1 | 225 | (1) | (1) | 32 | 64 |
| 1 | 225 | 1 | 225 | 31 | 61 |
| 1 | 225 | 1 | 350 | 19 | 48 |
| 1 | 225 | 5 | 225 | 30 | 60 |
| 1 | 225 | 5 | 350 | 13 | 48 |
| (1) | (1) | (1) | (1) | 46 | 81 |

[1] Untreated.

TABLE 4
[2,4-dihydroxy-benzophenone]

| Drying Conditions | | Heat Treatments | | Percent Tensile Loss (sunlight exposure) | |
|---|---|---|---|---|---|
| Time (min.) | Temp. (° F.) | Time (min.) | Temp. (° F.) | 1 week | 3 weeks |
| 1% SOLIDS ON FABRIC | | | | | |
| 1 | 225 | 1 | 225 | 30 | 63 |
| 1 | 225 | 1 | 350 | 20 | 52 |
| 1 | 225 | 5 | 350 | 23 | 53 |
| 3% SOLIDS ON FABRIC | | | | | |
| 1 | 225 | 3 | 300 | 5 | 27 |
| 1 | 225 | 3 | 300 | 3 | 29 |
| 5% SOLIDS ON FABRIC | | | | | |
| 1 | 225 | 1 | 225 | 11 | 45 |
| 1 | 225 | 1 | 350 | 1 | 13 |
| 1 | 225 | 5 | 225 | 11 | 40 |
| 1 | 225 | 5 | 350 | 4 | 79 |
| (1) | (1) | (1) | (1) | 28 | 83 |

[1] Untreated.

TABLE 5
[2,2',4-trihydroxy-benzophenone]

| Drying Conditions | | Heat Treatments | | Percent Tensile Loss (sunlight exposure) | |
|---|---|---|---|---|---|
| Time (min.) | Temp. (° F.) | Time (min.) | Temp. (° F.) | 1 week | 3 weeks |
| 1% SOLIDS ON FABRIC | | | | | |
| 1 | 225 | 1 | 225 | 19 | 49 |
| 1 | 225 | 1 | 350 | 17 | 22 |
| 1 | 225 | 5 | 225 | 25 | 57 |
| 1 | 225 | 5 | 350 | 24 | 47 |

TABLE 5—Continued

3% SOLIDS ON FABRIC

| 1 | 225 | 3 | 300 | 5 | 7 |
| 1 | 225 | 3 | 300 | 1 | 12 |

5% SOLIDS ON FABRIC

| 1   | 225 | 1   | 225 | 4  | 34 |
| 1   | 225 | 5   | 225 | 7  | 26 |
| 1   | 225 | 5   | 350 | 5  | 14 |
| (1) | (1) | (1) | (1) | 28 | 83 |

[1] Untreated.

In most instances it is shown that with the use of the added heat treatment step, particularly at high temperatures with short heating times, there will result less strength loss of the treated nylon as compared with untreated fabric after exposure to ultraviolet radiation for 1 and 3 weeks respectively.

Absorbers 2,2',4-trihydroxybenzophenone and 2,4-dihydroxybenzophenone are noted to be exceptionally good at high temperatures and short heating times, which seems to indicate that with the increased number of hydroxy groups in the molecule, better protection of the nylon is achieved whereas the protection is not as great in those cases where absorbers characterized by the presence of alkoxy groups are employed.

Example 2

Other experiments are performed whereby 3 percent solids (owf) of UV absorbers, phenyl beta-resorcylate, 2,2'-dihydroxy-4-methoxybenzophenone or 2,4-dihydroxybenzophenone are employed in blends with the various textile finishing agents listed below:

Code:    Textile finishing agent:
- A—Melamine based fatty amide resin plus inorganic ammonium salt.
- B—Silicone type water repellent plus zinc salt of saturated fatty acid.
- C—Emulsified polyethylene.
- D—Lactic acid colloid of methylated triazine formaldehyde resin.
- E—Methylated triazine formaldehyde resin.
- F—Styrene ethylacrylate copolymer.
- G—Polyvinyl acetate emulsion.
- H—Low molecular weight polyacrylic acid.

The general procedure of preparing these application baths is as follows:

The specific amount of finishing agent required is weighed into a 1000 gram beaker and sufficient room temperature water is added to complete the total weight required (minus the UV absorber). Stirring, the ultraviolet absorber is added to complete the total bath.

A swatch of filament nylon taffeta is passed through the individual solutions and squeezed on a conventional three roll padder.

All of the wetted samples are air dried at room temperature. A portion of each dried sample is then subjected to further heat treatment at 300° F. for 3 minutes.

Scott tensile tests are performed afer 40 hours exposure to Fade-O-Meter testing. Percent loss in fabric strength data obtained is shown in Table 6.

As will be noted from a view of the tabulated data in Table 6, it will be observed that the heat treatment of the fabric containing the ultraviolet radiation absorbers acts to reduce the loss in tensile strength of the fibers treated when compared with untreated fibers which were simply coated with the compounds. The above values were obtained by means of a Fade-O-Meter Test which is a conventional testing method more particularly described in the Technical Manual for 1960 of the American Association of Textile Chemists and Colorists published by the Howe Publishing Company, New York, N.Y. This specific test is described as Standard Test Method 16a, 1960 on pages 98 and 99 of the manual. As described therein the test essentially involves a treatment of two samples of nylon, for instance, with ultraviolet containing light from a standard light source. The effect of the light on the fabric is noted by the relative fading of the irridated samples.

With respect to the location of the ultraviolet absorbers in the impregnated nylon fibers it has been observed that nylon fibers varying from about 18–20 microns in cross sectional diameter after treatment in the manner of our invention will exhibit a non-uniform band of ultraviolet absorber of the class described, such as 2,2'-dihydroxy-4-methoxybenzophenone extending into the peripheral areas of the fiber, a distance of from about 500 to 3000 m$\mu$. when viewed under a Bausch and Lomb ultraviolet photo microscope at 500×magnification. The cross sections viewed are prepared using an embedding medium composed of 2 parts gum arabic, 2 parts water and 1 part glycerine. This medium besides being transparent to UV radiation contains no component which would cause the UV absorber to dissolve and migrate within the section. The mounting medium is glycerine and the slides and cover glasses used are quartz. This preparation enables one to employ ultraviolet radiation of 253 m$\mu$. where the treated samples have strong absorption properties.

TABLE 6.—PERCENT TENSILE LOSS OF NYLON TAFFETA AFTER 40 HOURS EXPOSURE TO ULTRAVIOLET LIGHT IN FADE-O-METER

[3% solids of UV absorbers used with finishing agent]

| Textile Finishing Agent Used Percent Solids | Dry and Cure Conditions | 2-hydroxy-4-methoxy-benzophenone | UV Absorbers | | 2,4 dihydroxy-benzophenone |
|---|---|---|---|---|---|
| | | | Phenyl beta-resorcylate | 2,2'-dihydroxy-4-methoxybenzophenone | |
| None | Air dried | 91 | 81 | 79 | 78 |
| | Air dried plus 3 minutes at 300° F | 82 | 51 | 38 | 56 |
| 3 percent A | Air dried | 91 | 82 | 73 | 71 |
| 3 percent B | Air dried | 94 | 81 | 77 | 73 |
| | Air dried plus 3 minutes at 300° F | 79 | 43 | 41 | 47 |
| 3 percent C | Air dried | 92 | 83 | 74 | 73 |
| | Air dried plus 3 minutes at 300° F | 81 | 47 | 40 | 57 |
| 1.5 percent D | Air dried | 92 | 83 | 76 | 74 |
| | Air dried plus 3 minutes at 300° F | 80 | 37 | 37 | 48 |
| 3 percent E | Air dried | 85 | 81 | 77 | 68 |
| | Air dried plus 3 minutes at 300° F | 73 | 77 | 63 | 54 |
| 3 percent F | Air dried | 80 | 84 | 67 | 73 |
| | Air dried plus 3 minutes at 300° F | 77 | 41 | 59 | 52 |
| 3 percent G | Air dried | 84 | 84 | 65 | 76 |
| | Air dried plus 3 minutes at 300° F | 78 | 52 | 41 | 59 |
| 3 percent H | Air dried | 85 | 70 | 61 | 70 |
| | Air dried plus 3 minutes at 300° F | 81 | 51 | 39 | 55 |
| Untreated | | 95 | 95 | 95 | 95 |

We claim:

1. A method for the stabilization of nylon material which comprises applying thereto a stabilizing amount of a compound of the general structure:

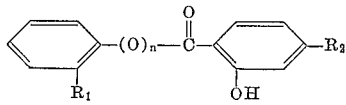

wherein $R_1$ is selected from the group consisting of hydrogen and hydroxy, $R_2$ is selected from the group consisting of hydroxy and lower alkoxy and $n$ represents an integer selected from the group consisting of 0 and 1; drying said treated material and subsequently dry heat treating the material within the range of from about 225° F. up to about 350° F. for a period of time sufficient to effect a non-uniform penetration of said compound into the body of said nylon material in an amount sufficient to stabilize said material against the degrading effect of ultraviolet light, said period of time ranging from about 0.5 minute to about 5.0 minutes.

2. A method for the stabilization of nylon material which comprises applying thereto a stabilizing amount of a compound of the general structure:

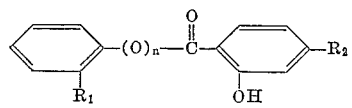

wherein $R_1$ is selected from the group consisting of hydrogen and hydroxy, $R_2$ is selected from the group consisting of hydroxy and lower alkoxy and $n$ represents an integer selected from the group consisting of 0 and 1; drying said treated material, and subsequently dry heat treating the material within the temperature range of from about 225° F. up to about 350° F. for a period of time sufficient to effect a nonuniform penetration of said compound into the body of said nylon material in an amount sufficient to stabilize said material against the degrading effect of ultraviolet light, the relative ratio of said temperature and said period of penetration being sufficient that said stabilizer extends substantially beneath said treated material's surface, said period of time ranging from about 0.5 minute to about 5 minutes.

3. A method for treatment of a formed nylon article to reduce ultraviolet degradation therein which comprises applying to a surface thereof an aqueous emulsion containing a compound of the general structure:

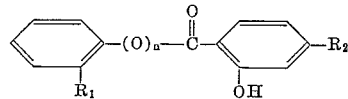

wherein $R_1$ is selected from the group consisting of hydrogen and hydroxy; $R_2$ is selected from the group consisting of hydroxy and lower alkoxy and $n$ represents either 0 or 1; drying the article sufficiently to form a concentrated outer layer of said compound on and near said surface and dry heat treating the article at a temperature of not less than about 225° F. nor more than about 350° F. for a period of time sufficient to effect a penetration of the compound into the treated article in a concentrated band extending substantially beneath the surface of the article, said period of time ranging from about 0.5 minute to about 5.0 minutes.

4. A method for treatment of a formed nylon article to reduce ultraviolet degradation therein which comprises applying to a surface thereof an emulsion containing, as a disperse phase, a 20–30% solution in inorganic solvent of a compound of the formula:

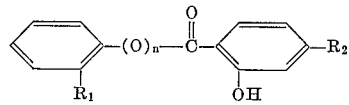

wherein $R_1$ is selected from the group consisting of hydrogen and hydroxy; $R_2$ is selected from the group consisting of hydroxy and lower alkoxy and $n$ represents either 0 or 1; drying said article sufficiently to form a concentrated outer layer of said compound near said surface, and dry heat treating the article at a temperature of not less than about 225° F. nor more than about 350° F. for a period of time sufficient to effect a penetration of the compound into the article in a concentrated band extending substantially beneath the surface of the article, said period of time ranging from about 0.5 minute to about 5 minutes.

5. A method according to claim 1 wherein the ultraviolet light absorber employed is 2,4-dihydroxybenzophenone.

6. A method according to claim 1 wherein the ultraviolet light absorber employed is 2,2'-4-trihydroxybenzophenone.

7. A method according to claim 1 wherein the ultraviolet radiation absorber employed is phenyl betaresorcylate.

8. A method according to claim 1 wherein the ultraviolet radiation absorber employed is 2,2'-dihydroxy-4-methoxybenzophenone.

9. A method according to claim 1 wherein the ultraviolet radiation absorber employed is 2-hydroxy-4-octoxybenzophenone.

10. A method according to claim 1 wherein the ultraviolet radiation absorber employed is 2,2'-dihydroxy-4-octoxybenzophenone.

References Cited by the Examiner

UNITED STATES PATENTS

| | | | |
|---|---|---|---|
| 2,568,894 | 9/1951 | Mackey | 260—45.95 |
| 2,682,559 | 6/1954 | Stanley et al. | 260—45.95 |
| 2,920,978 | 1/1960 | Randall | 260—45.95 |
| 2,955,955 | 10/1960 | Orr | 260—45.95 |
| 2,976,259 | 1/1961 | Hardy et al. | 260—45.95 |
| 3,006,887 | 10/1961 | Schoepffle et al. | 260—45.95 |
| 3,006,959 | 10/1961 | Armitage et al. | 260—45.95 |
| 3,113,880 | 12/1963 | Hoeschele et al. | 260—45.95 |

LEON J. BERCOVITZ, *Primary Examiner.*

ALFONSO D. SULLIVAN, WILLIAM H. SHORT,
*Examiners.*

H. W. HAEUSSLER, H. E. TAYLOR,
*Assistant Examiners.*